US012528512B2

(12) United States Patent
Zheng et al.

(10) Patent No.: US 12,528,512 B2
(45) Date of Patent: Jan. 20, 2026

(54) PERCEPTION AND UNDERSTANDING OF VULNERABLE ROAD USERS

(71) Applicant: GM Cruise Holdings LLC, San Francisco, CA (US)

(72) Inventors: Shuai Zheng, Santa Clara, CA (US); Navaneeth Bodla, Redwood City, CA (US); Ankit Raj, Santa Clara, CA (US); Ruxiao Bao, San Jose, CA (US); Amirreza Shaban, Bellevue, WA (US); Gweltaz Lever, San Francisco, CA (US); Sachithra Hemachandra, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 238 days.

(21) Appl. No.: 18/326,780

(22) Filed: May 31, 2023

(65) Prior Publication Data
US 2024/0400108 A1 Dec. 5, 2024

(51) Int. Cl.
B60W 60/00 (2020.01)
G06V 10/82 (2022.01)
G06V 20/58 (2022.01)
G06V 40/20 (2022.01)

(52) U.S. Cl.
CPC ......... *B60W 60/0027* (2020.02); *G06V 10/82* (2022.01); *G06V 20/58* (2022.01); *G06V 40/20* (2022.01); *B60W 2554/4029* (2020.02); *B60W 2554/80* (2020.02); *B60W 2556/40* (2020.02)

(58) Field of Classification Search
CPC ..... B60W 60/0027; B60W 2554/4029; B60W 2556/40; B60W 2554/80; G06V 20/58
See application file for complete search history.

(56) References Cited

U.S. PATENT DOCUMENTS 9,928,448 B1 * 3/2018 Merler .................. G06V 20/35
10,489,665 B2   11/2019 Creusot
(Continued)

FOREIGN PATENT DOCUMENTS

DE       102022206131 A1 * 12/2023

OTHER PUBLICATIONS

Zuo et al, "Det2Seg: A Two-Stage Approach for Road Object Segmentation from 3D Point Clouds", 2019, IEEE (Year: 2019).*
(Continued)

*Primary Examiner* — Kenneth M Dunne
(74) *Attorney, Agent, or Firm* — CANTOR COLBURN LLP

(57) ABSTRACT

Autonomous vehicles utilize perception and understanding of road users and road objects to predict behaviors of the road users and road objects, and to plan a trajectory for the vehicle. Understanding subtypes and attributes of vulnerable road users may help autonomous vehicles better predict behaviors of and react to vulnerable road users. To offer additional understanding capabilities, an additional understanding model is added to the perception and understanding pipeline to improve classification of vulnerable road users and extraction of attributes of the vulnerable road users. The exemplary architectures of the understanding model balance recall and precision performance metrics and computational complexity.

20 Claims, 9 Drawing Sheets

(56) References Cited

U.S. PATENT DOCUMENTS

2003/0058341 A1* 3/2003 Brodsky ............... G06V 20/52
348/E7.086
2024/0233314 A1* 7/2024 Suh ........................ G06T 7/11

OTHER PUBLICATIONS

Fang et al., "Fine-Grained Vehicle Model Recognition Using A Coarse-to-Fine Convolutional Neural Network Architecture", 2017, IEEE (Year: 2017).*
Sun et al., "Vehicle Type Recognition Combining Global and Local Features via Two-Stage Classification", 2017 (Year: 2017).*
Guo et al., *On Calibration of Modern Neural Networks*, arXiv:1706.04599v2 [cs.LG], Aug. 3, 2017, 14 pages.
Mozafari et al., *Attended Temperature Scaling: A Practical Approach for Calibrating Deep Neural Networks*, arXiv:1810.11586v3 [cs.LG], May 8, 2019, 10 pages.
Ranga et al., VRUNet: *Multi-Task Learning Model for Intent Prediction of Vulnerable Road Users*, arXiv:2007.05397v1 [cs.CV], Jul. 10, 2020, 9 pages.
Ouyang et al., A *3D-CNN and LSTM Based Multi-Task Learning Architecture for Action Recognition*, Special Section on AI-Driven Big Data Processing: Theory, Methodology, and Applications, IEEE Access, vol. 7, Date of Current Version Apr. 10, 2019, 14 pages.

* cited by examiner

PERCEPTION AND UNDERSTANDING OF VULNERABLE ROAD USERS

BACKGROUND

Technical Field

The present disclosure generally relates to autonomous vehicles (AVs) and, more specifically, to perception and understanding of road users by AVs. Road users may include vulnerable road users (VRUs).

INTRODUCTION

AVs, also known as self-driving cars, and driverless vehicles, may be vehicles that use multiple sensors to sense the environment and move without human input. Automation technology in AVs may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
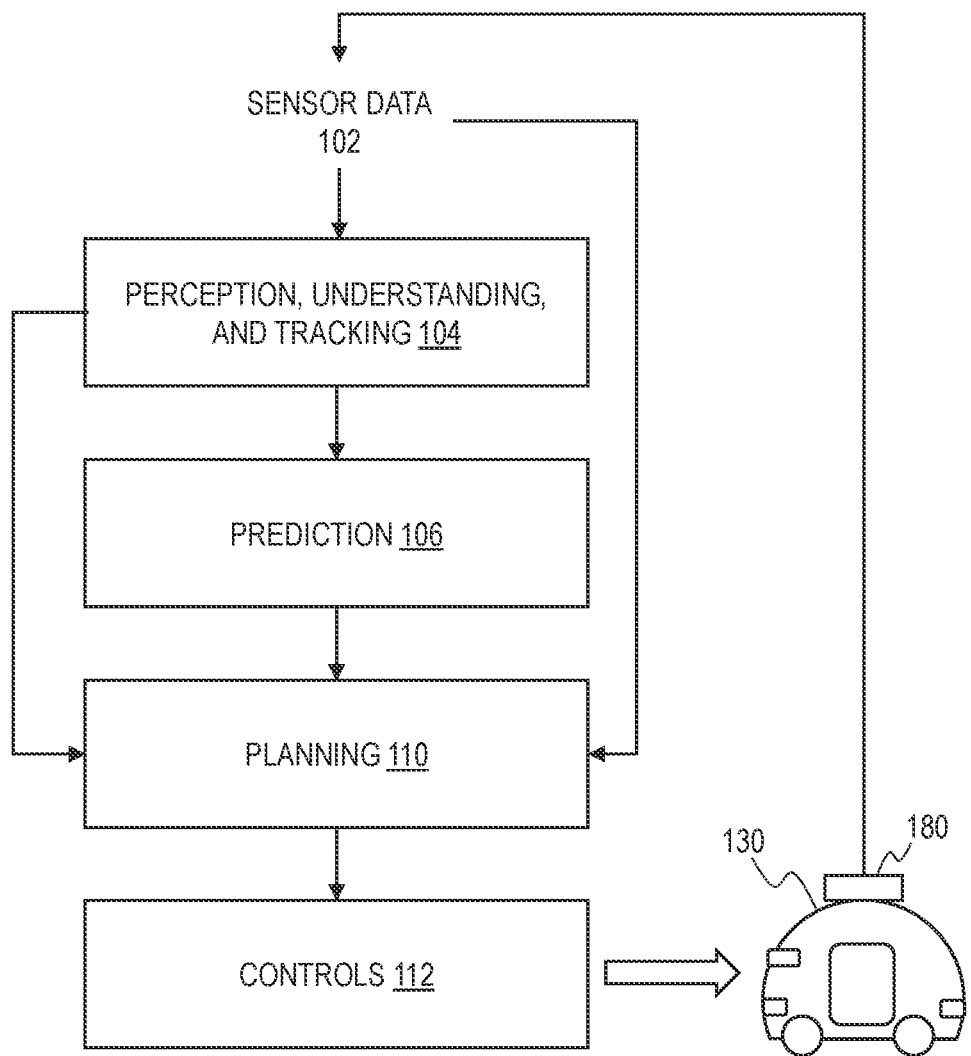
FIG. 1 illustrates an exemplary AV stack and an AV, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering an opportunity for efficient, accessible, and affordable transportation. AVs utilize perception and understanding of road users and road objects to predict behaviors of the road users and road objects, and to plan a trajectory for the vehicle. Understanding subtypes and attributes of vulnerable road users may help AVs better predict behaviors of and react to vulnerable road users. Examples of subtypes of vulnerable road users may include a bicyclist classification, a motorcyclist classification, a pedestrian classification, a portable vehicle rider classification, person with mobility needs classification, etc. Examples of attributes of vulnerable road users may include whether a person is wearing a reflective vest, whether a person is a human controlling traffic, whether the person is gazing at or paying attention to the AV, whether a person is making a gesture, understanding the type or kind of gesture the person is making, what intent the person has (e.g., to cross an intersection, to wait, to run, to yield, etc.), whether the person has fallen (or is about to fall or lose balance), whether the person is a law enforcement officer, whether the person is looking at a mobile device, etc. Ability to understand these subtypes and attributes may assist with further understanding of the environment of the AV, prediction of behaviors/movements of the vulnerable road users, and planning of a trajectory for the AV.

To offer additional understanding capabilities for vulnerable road users, an additional understanding model is added to the perception and understanding pipeline to improve classification of vulnerable road users (e.g., provide fine-grained classifications of vulnerable road users) and extraction of attributes of the vulnerable road users. The exemplary architectures of the understanding model balance recall and precision performance metrics and computational complexity. The vulnerable road user understanding model may serve as a sub-model to a main understanding model. Other understanding sub-models or downstream models may consume outputs of the vulnerable road user understanding model, if desired.

The vulnerable road user understanding model can output inferences such as vulnerable road user subtype classification and extraction of vulnerable road user attributes. The rich taxonomy of vulnerable road user subtype classifications and vulnerable road user attributes can benefit downstream consumers of the information, such as traffic directives understanding, interactions/relationships of road users understanding, prediction of objects' behavior and movements, and planning of the AV. The tasks to generate classifications and attributes of the taxonomy may be arranged or grouped into multiple task groups. A task group may include one or more tasks. The vulnerable road user understanding model can be implemented as a multi-task learning model that has a shared backbone, temporal networks dedicated to the task groups, and heads that are dedicated to task groups (e.g., each head may be dedicated to an individual task). Certain task groups may benefit from having global spatial information and local spatial information. In some embodiments, the shared backbone may generate local spatial maps and global spatial maps. Spatial networks dedicated to task groups may be included to process the local spatial maps and generate task group specific spatial maps. The global spatial maps and task group specific spatial maps can be provided together to the temporal networks.

The use of a shared backbone may prevent overfitting, when compared with the alternative of having separate models for each task or each task group. Because the vulnerable road user understanding model focuses on tasks that are all addressing vulnerable road users, the shared backbone may learn features which are common to these tasks or task groups, while leaving the temporal networks, spatial networks, and heads dedicated to tasks or task groups to learn features which are unique to the specific tasks or task groups. One or more temporal networks can be included at the output of the shared backbone and in front of one or more heads to learn features that may be dynamic (e.g., varies over time), or have kinematic behaviors. The features may relate to gestures, intent, etc. Multiple tasks (e.g., tasks of a task group) can share the same temporal network. Some tasks, or some task groups may have dedicated temporal networks (some tasks or task groups may not have dedicated temporal networks). Providing dedicated temporal networks to tasks or task groups has the benefit of allowing the dedicated temporal networks to be configured differently depending on the task or task group. Some task groups may benefit from temporal networks that have longer sequence lengths. Having heads and optionally spatial networks dedicated to tasks or task groups may improve precision and recall performance metrics of the classifications and attributes specific to those tasks or task groups. In some embodiments, the multi-task learning model implements dedicated networks for each task group. Strategic grouping of tasks into task groups can balance performance and computational complexity.

The output inferences of the vulnerable road user understanding model, in some cases, can be provided to one or more further sub-models for understanding an environment of the vehicle. For example, human controlling traffic sub-type classification and gesture-related attributes produced by the vulnerable road user understanding model can be provided to a traffic directives understanding sub-model, which may generate further understanding information to assist the planning of an AV. In another example, the output inferences, such as vulnerable road user subtype classifications and intent-related attributes may be provided to a prediction part which may predict behaviors or movements of vulnerable road users based on the output inferences. One or more downstream models may consume the output inferences, and expect the confidence estimate probability distributions to remain the same even when the model may be updated. The one or more downstream models may expect the confidence estimate to reflect ground truth correctness likelihood. Confidence estimates of the output inferences produced by the vulnerable road user understanding model may be post-processed to calibrate for deviations between model updates and/or over confidence issues.

Various embodiments herein and their advantages may apply to a wide range of vehicles (e.g., semi-autonomous vehicles, vehicles with driver-assist functionalities, etc.), and not just AVs.

Exemplary AV and an AV Stack that Controls the AV

FIG. 1 illustrates an exemplary AV stack and an AV 130, according to some aspects of the disclosed technology. An AV 130 may be equipped with a sensor suite 180 to sense the environment surrounding the AV and collect information (e.g., sensor data 102) to assist the AV in making driving decisions. The sensor suite 180 may include, e.g., sensor systems 804, 806, and 808 of FIG. 8. The AV stack may include perception, understanding, and tracking part 104, prediction part 106, planning part 110, and controls part 112. The sensor data 102 may be processed and analyzed by perception, understanding, and tracking part 104 to track objects in the environment of the AV and determine a perception and understanding of the environment of the AV 130. Prediction part 106 may determine future motions and behaviors of the AV and/or tracked objects in the environment of the AV 130. The AV 130 may localize itself based on location information (e.g., from location sensors) and the map information. The planning part 110 may create planned paths or trajectories based on one or more of: information from perception, understanding, and tracking part 104, information from prediction part 106, the sensor data 102, map information, localization information, etc. Subsequently, planned paths or trajectories can be provided to controls part 112 to generate vehicle control commands to control the AV 130 (e.g., for steering, accelerating, decelerating, braking, turning on vehicle signal lights, etc.) according to the planned path.

The operations of components of the AV stack may be implemented using a combination of hardware and software components. For instance, an AV stack performing the perception, understanding, prediction, planning, and control functionalities may be implemented as software code or firmware code encoded in non-transitory computer-readable medium. The code for AV stack may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network. At least a part of the AV stack may be implemented on local computing device 810 of FIG. 8. At least a part of the AV stack may be implemented on the computing system 900 of FIG. 9 and/or encoded in instructions of storage device 930 of FIG. 9.

Exemplary Perception, Understanding, and Tracking Architecture

Figure 2:
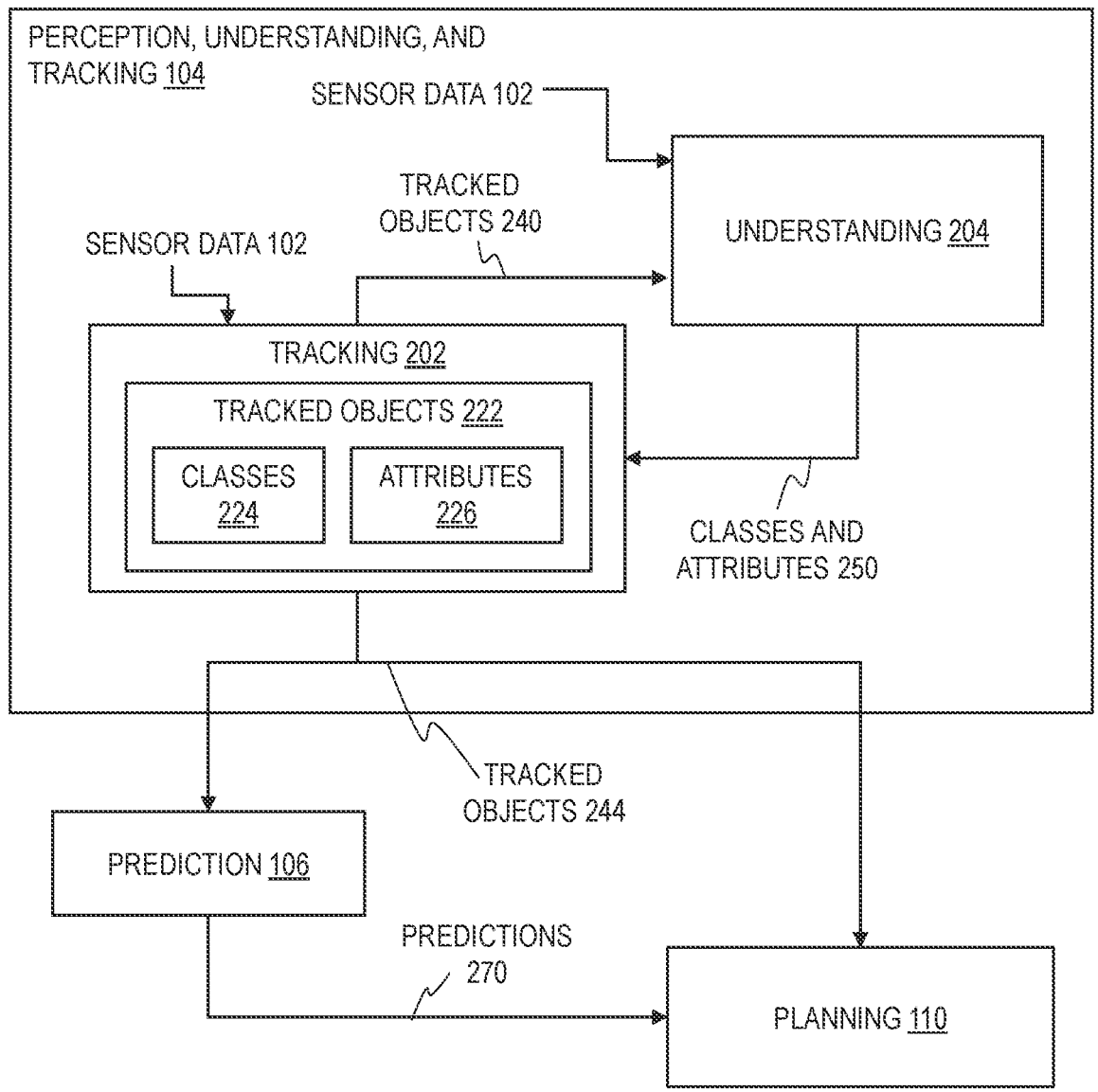
FIG. 2 illustrates an exemplary implementation of perception, understanding, and tracking part 104, prediction part 106, and planning part 110, according to some aspects of the disclosed technology.

FIG. 2 illustrates an exemplary implementation of perception, understanding, and tracking part 104, prediction part 106, and planning part 110, according to some aspects of the disclosed technology. The figure illustrates one exemplary configuration and arrangement of parts within an AV stack and is not intended to be limiting to the disclosure.

Perception, understanding, and tracking part 104 may include tracking part 202 and understanding part 204. Tracking part 202 may receive sensor data 102 from a sensor suite of an AV (the sensor suite may include, e.g., sensor systems

Figure 8:
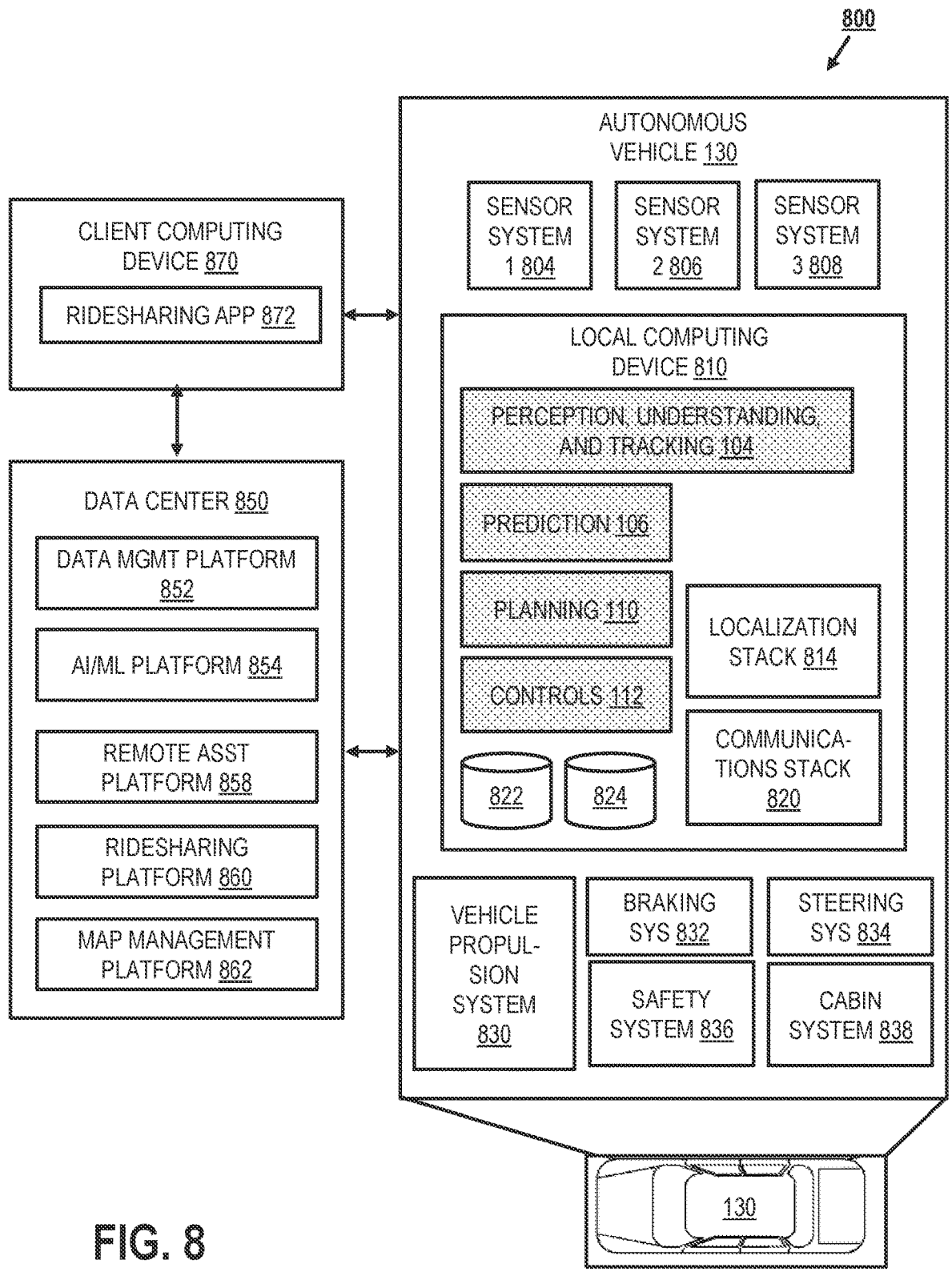
FIG. 8 illustrates an exemplary system environment that may be used to facilitate AV operations, according to some aspects of the disclosed technology.

804, 806, and 808 of FIG. 8). Tracking part 202 may determine from the sensor data 102 presence of objects in an environment of the AV and track the objects presence over time (or across frames of data). The presence of an object can be encoded as a bounding box defining boundaries and location of an object in a three-dimensional space. The presence of an object can be encoded as location information and size information that specify the object's occupancy in space.

Understanding part 204 may receive sensor data 102 and optionally tracked objects information 240 (of tracked objects 222) to understand the objects in the environment of the AV. Understanding part 204 may process sensor data 102, e.g., using one or more machine learning models, to produce inferences about the tracked objects 222, such as one or more classes and/or one or more attributes for tracked objects 222. Understanding part 204 may provide classes and attributes 250 as feedback information to tracking part 202. Directly or indirectly, classes and attributes 250 produced by understanding part 204 may be provided to prediction part 106 and/or planning part 110 to assist prediction and/or planning functionalities respectively.

As illustrated in the figure, tracking part 202 may serve as a classes and attributes collector and can collect and maintain classes 224 and/or attributes 226 for tracked objects 222. The objects and information associated with the objects may be maintained as tracked objects 222 in tracking part 202. Tracked objects 222 may be in a format of a database or collection of data that includes data entries for tracked objects 222, where each data entry for a tracked object may include information for the tracked object, such as an object identifier of the tracked object, bounding box of the tracked object, one or more classifications of the tracked object, and one or more attributes of the tracked object. Tracked objects 222 may be in a different format, e.g., such as a grid map or raster map of an environment surrounding the AV, whose pixels may store information for various tracked objects, such as an object identifier of the tracked object, bounding box of the tracked object, one or more classifications of the tracked object, and one or more attributes of the tracked object.

Perception, understanding, and tracking part 104 may provide tracked objects information 244 (of tracked objects 222) to prediction part 106. Perception, understanding, and tracking part 104 may provide tracked objects information 244 (of tracked objects 222) to planning part 110. Prediction part 106 may provide predictions 270 to planning part 110. Tracked objects information 240 and/or tracked objects information 244 may include at least some of the information maintained in tracked objects 222. Tracked objects information 244 provided from tracking part 202 to prediction part 106 and planning part 110 may include information produced by tracking part 202 and information produced by understanding part 204.

Exemplary Understanding Part Having Multiple Models

Figure 3:
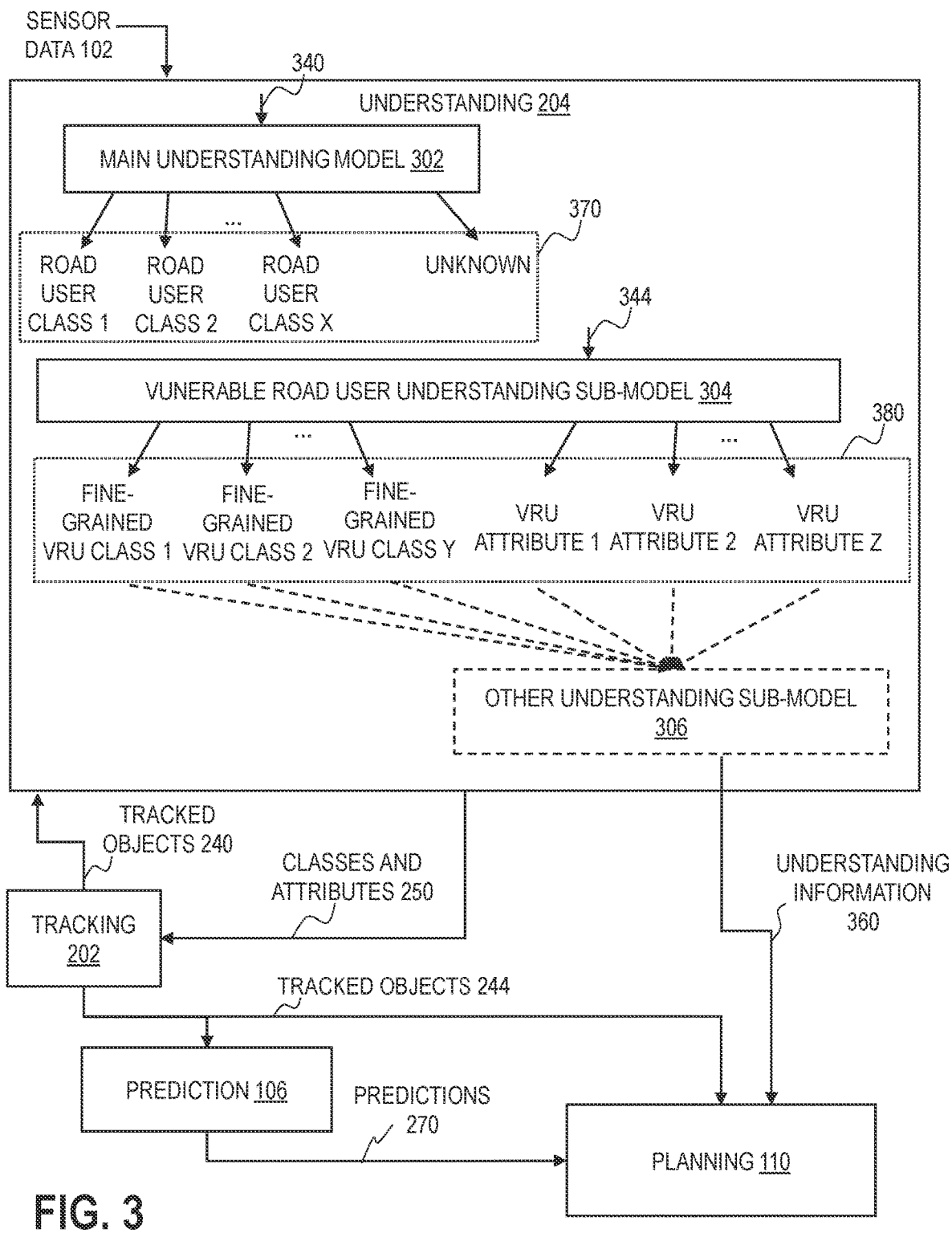
FIG. 3 illustrates an exemplary implementation of understanding part 204, tracking part 104, prediction part 106, and planning part 110, according to some aspects of the disclosed technology.

FIG. 3 illustrates an exemplary implementation of understanding part 204, tracking part 104, prediction part 106, and planning part 110, according to some aspects of the disclosed technology. The parts may form at least a part of an AV stack for an AV (not shown). The AV may have sensors, one or more processors, and one or more storage media encoding instructions executable by the one or more processors to implement one or more parts of the AV stack, such as the parts illustrated in the figure. The sensors may include, e.g., sensor systems 804, 806, and 808 of FIG. 8. The one or more processors and the one or more storage media may be an exemplary implementation of local computing device 810 of FIG. 8. The one or more processors and the one or more storage media may be an exemplary implementation of the computing system 900 of FIG. 9. One or more models may be machine learning models.

Understanding part 204 may include a main understanding model 302 and a vulnerable road user understanding sub-model 304. The main understanding model 302 may classify a tracked object into at least one of: one or more road user classifications, and an unknown road user/object classification. The one or more road user classifications may include, e.g., a vehicle classification, a bicycle classification, a motorcycle classification, a vulnerable road user classification, etc. In some cases, the main understanding model 302 may receive sensor data 340 that corresponds to a tracked object, such as a tracked object that has not yet been classified by an understanding model (e.g., tracking part 202 may have detected the presence of the tracked object, and understanding part 204 has not yet produced an inference). Main understanding model 302 may have one or more outputs 370 that produce one or more inferences on the tracked object, e.g., whether the tracked object represented in the input sensor data 340 belongs to one or more classes or classifications. As illustrated, main understanding model 302 may output an inference that assigns the tracked object to one of several classes, e.g., road user class 1, road user class 2, . . . road user class X, and unknown class. Preferably, the main understanding model 302 can identify road users in the environment of the AV. Examples of road user classes may include: vehicle class, bicycle class, motorcycle class, vulnerable road user class, etc. Examples of unknown user/object classifications may include unknown user/object, dynamic unknown user/object (e.g., moving unknown user/object), and static unknown user/object (e.g., stationary unknown user/object). Inferences from one or more outputs 370 may be provided to tracking part 202.

The vulnerable road user understanding sub-model 304 may classify a tracked object with vulnerable road user classification assigned or inferred by the main understanding model 302, into one or more vulnerable road user subtype classes. Examples of vulnerable road user subtype class can include, e.g., pedestrians, persons on wheelchair, persons on bicycles (or bicyclists), persons on motorcycles (or motorcyclists), persons on portable mobility device (e.g., persons on wheeled mobility devices), etc. The vulnerable road user understanding sub-model 304 may extract one or more vulnerable road user attributes about the tracked object. Vulnerable road user understanding sub-model 304 may receive sensor data 344 (generated from the sensors of the AV) corresponding to tracked objects having the vulnerable road user classification, such as a tracked object that has been classified by main understanding model 302 as having the vulnerable road user classification. Vulnerable road user understanding sub-model 304 may have one or more outputs 380 that produce one or more inferences on the tracked object having the vulnerable road user classification. Exemplary inferences may include whether the tracked object represented in the input sensor data 344 belongs to one or more vulnerable road user subtype classes or classifications. Exemplary inferences may include whether the tracked object represented in the input sensor data 344 has certain vulnerable road user attributes or properties. As illustrated, the vulnerable road user understanding sub-model 304 may output an inference that assigns the tracked object having a vulnerable road user classification to one of several vulnerable road user subtype classes, e.g., fine-grained vulnerable road user class 1, fine-grained vulnerable road user class 2 . . . and fine-grained vulnerable road user class Y. The vulnerable road user understanding sub-model 304 may output inferences about one or more attributes (or properties) of the tracked object, e.g., vulnerable road user attribute 1, vulnerable road user attribute 2 . . . and vulnerable road user attribute Z. Outputs 380, e.g., encoding inferences of vulnerable road user understanding sub-model 304, may indicate discrete classes (e.g., a class) and/or continuous values (e.g., a probability or likelihood).

Vulnerable road user understanding sub-model 304 may be a multi-task learning model to generate inferences on vulnerable road users, and produce meaningful and rich inferences that can support other parts of the AV stack. Tasks being performed by the multi-task learning model may output respective inferences. Tasks producing inferences may be arranged or assigned into task groups. In other words, a task group may include one or more tasks, or may generate one or more inferences corresponding to the tasks. Parts (e.g., layers, or networks) of the multi-task learning model may be dedicated to processing data, extracting features, and/or generating inferences of respective task groups. Tasks in a task group may share a part of the multi-task learning model dedicated to the task group.

The vulnerable road user understanding sub-model 304 may include a shared backbone, a plurality of temporal networks, and a plurality of heads. The shared backbone may receive and process sensor data generated from the sensors corresponding to tracked objects having the vulnerable road user classification. The temporal networks may be dedicated to respective task groups. A temporal network dedicated to a task group may process an output of the shared backbone and provide an output to head(s) that are outputting inferences for the task group. The plurality of heads may output inferences for respective task groups. The inferences may include one or more vulnerable road user subtype classifications and one or more vulnerable road user attributes. Exemplary architectures for the vulnerable road user understanding sub-model 304 are illustrated and described with FIGS. 5-6. Variations of the architecture may balance performance and computational complexity of the model.

Inferences of Vulnerable Road Users and Task Grouping Considerations

The vulnerable road user understanding sub-model 304 may be implemented to produce many inferences about tracked objects with the vulnerable road user classification. Inferences can include classifications (e.g., whether a tracked object belongs to or matches a certain subtype class or classification out of a set of classifications), and attributes (e.g., whether a tracked object has a certain attribute or property). A tracked object can belong to a class or classification, and may have one or more attributes. The vulnerable road user understanding sub-model 304 may produce a continuous value (or probability) that a tracked object belongs to or matches a certain subtype class or classification. The vulnerable road user understanding sub-model 304 may produce a vulnerable road user subtype inference that that selects between two or more vulnerable road user subtype classifications (e.g., outputs a classification to which a given tracked object most likely belong or has the best match). The vulnerable road user understanding sub-model 304 may produce a continuous value (or probability) that a tracked object exhibits a certain attribute or property. The vulnerable road user understanding sub-model 304 may produce a binary value indicating whether a tracked object exhibits a certain attribute or property. A task refers to the production of an inference by a multi-task learning model. In some cases, attributes may represent sub-classes or sub-classifications of a vulnerable road user classification subtype class.

As a multi-task learning model, the vulnerable road user understanding sub-model 304 may perform many tasks. The vulnerable road user understanding sub-model 304 may have heads (sometimes referred to as task heads) as the output networks that are generating the inferences.

Exemplary inferences related to vulnerable road user subtype classifications can include:

Bicyclist (person riding a bicycle) classification,

Motorcyclist (person riding a motorcycle) classification,

Person (on foot) classification,

Person with mobility needs classification (person using a mobility assistance device such as cane, or wheelchair) classification, Portable vehicle rider classification (person on electric scooter, skateboard, etc.), and Non-vulnerable road user classification (parked, not riding on mobility device, not on road).

Exemplary inferences related to vulnerable road user attributes can include:

Gaze attribute: whether a vulnerable road user is paying attention to the AV,

Gaze attribute: whether a vulnerable road user is paying attention to the surroundings of the vulnerable road user, Gaze attribute: whether a vulnerable road user is distracted, Gaze attribute: whether a vulnerable road user is looking to the left (left from the perspective of the AV), Gaze attribute: whether a vulnerable road user is looking to the right (right from the perspective of the AV), Gaze attribute: whether a vulnerable road user is looking forward (forward from the perspective of the AV), Human controlling traffic attribute: whether vulnerable road user is a human controlling traffic, Human controlling traffic subtype classification or attribute: whether vulnerable road user is a law enforcement officer or police officer, Human controlling traffic subtype classification or attribute: whether vulnerable road user is wearing a reflective vest, Human controlling traffic subtype classification or attribute: whether vulnerable road user is a firefighter, Human controlling traffic subtype classification or attribute: whether vulnerable road user is a paramedic, Human controlling traffic/gesture attribute: whether vulnerable road user is directing the AV, Human controlling traffic/gesture attribute: whether vulnerable road user is holding a sign, Human controlling traffic/gesture attribute: whether vulnerable road user is holding a SLOW sign, Human controlling traffic/gesture attribute: whether vulnerable road user is holding a STOP sign, Human controlling traffic/gesture attribute: whether vulnerable road user is making a gesture to direct traffic, Human controlling traffic/gesture attribute: whether vulnerable road user is gesturing GO STRAIGHT, Human controlling traffic/gesture attribute: whether vulnerable road user is gesturing GO LEFT, Human controlling traffic/gesture attribute: whether vulnerable road user is gesturing GO RIGHT, Human controlling traffic/gesture attribute: whether vulnerable road user is gesturing STOP, Fall attribute: whether a vulnerable user is falling, Fall attribute: whether a vulnerable user is lying on the ground, Fall attribute: whether a vulnerable user is falling and lying onto the ground, Fall attribute: whether a vulnerable user is on their knees on the ground, Intent attribute: whether a vulnerable user intends to cross the road, Intent attribute: whether a vulnerable user intends to wait at an intersection, Intent attribute: whether a vulnerable user intends to cross the road, Intent attribute: whether a vulnerable user intends to change lanes, Intent attribute: whether a vulnerable user intends to yield, Intent attribute: whether a vulnerable user intends to speed up, and Intent attribute: whether a vulnerable user intends to slow down.

It may be desirable for understanding part 204 of FIG. 2 to generate many inferences about vulnerable road users. Generating many inferences can be a challenge, because having a separate machine learning model for each task would be computationally too expensive and may result in overfitting of the model to individual tasks. In some cases, a multi-task learning model may be implemented so that the tasks can share a backbone but may include networks that are dedicated to individual tasks. Computational complexity may grow linearly with the number of tasks. By carefully grouping tasks into task groups, tasks in a specific task group may share the dedicated parts of a multi-task learning model for the task group, avoid overfitting, and reduce computational complexity.

The vulnerable road user understanding sub-model 304 may generate inferences for two or more task groups. In some embodiments, the vulnerable road user understanding sub-model 304 may generate inferences for three task groups. If the tasks are not grouped into task groups, the multi-task learning model may provide many dedicated parts to the tasks individually, which can significantly increase computational complexity without significant improvement in performance of the individual tasks.

Arranging and defining the task groups are not trivial. Since each task group may have a dedicated temporal network, heads, and in some cases a dedicated spatial network, computational complexity can be high if there are too many task groups. Not implementing enough task groups may mean that performance of the task group may suffer, since the learning for all the tasks in a task group may become over generalized. Offering dedicated networks for task groups allows for configurability (e.g., tuning for specific task groups), which may offer some efficiencies if the dedicated networks can be configured to reduce excessive or unnecessary processing for the required performance. Providing dedicated networks also may offer machine learning of features that would be specific to the task group, which may improve precision and recall performance of the task groups.

Preferably, tasks that may be similar in nature may be grouped into a task group. Tasks that are extracting classifications and/or attributes that are more static in nature may be grouped into a task group. Fine-grained vulnerable road user subtype classification, some fall attributes, and gaze attributes may be more static in nature. Tasks that are extracting attributes that are related to the same region of a human body may be grouped into a task group. Human controlling traffic subtype classification or attributes may relate to the torso and arms region of the human body. Tasks that are extracting attributes that may rely on a longer sequence of images may be grouped into a task group. Tasks to extract intent attributes may rely on relatively longer sequences or frames of sensor data. A given task may be added to a task group to ensure that the given task does not get overpowered by the loss function of another task in the same task group.

In some embodiments, the vulnerable road user understanding sub-model 304 has three task groups and takes into account some of the considerations mentioned above. A first task group can extract vulnerable road user subtype classifications, extract fall attributes (whether a pedestrian has fallen), and extract gaze attributes. A second task group can extract human controlling traffic subtype classifications and/or attributes and extract human controlling traffic gesture attributes. A third task group to extract vulnerable road user intent attributes. Exemplary architectures for the vulnerable road user understanding sub-model 304 to produce inferences for three (or more) task groups are illustrated and described with FIGS. 5-6. Variations of the architecture may balance performance and computational complexity of the model.

Exemplary Downstream Consumers of Vulnerable Road User Understanding Sub-Model

Inference(s) produced by vulnerable road user understanding sub-model 304 can advantageously be used by one or more downstream understanding models to better understand the environment surrounding an AV. Referring back to FIG. 3, understanding part 204 may include other understanding sub-model 306. The other understanding sub-model 306 may process sensor data and/or other information to understand interactions of, connections between, or relationships between, various road users on the road. The other understanding sub-model 306 may produce understanding information 360 to downstream parts such as, tracking part 202, prediction part 106, and planning part 110.

The other understanding sub-model 306 may be an interactions/relationship understanding sub-model, which may process sensor data and/or other information to understand relationships and interactions between different road users. For example, interactions and relationships understanding may help understand whether a bicyclist will yield to the AV making a lane change, understand whether a vulnerable road user will adhere to traffic rules at an intersection, or understand if vulnerable road users are traveling as a group. The other understanding sub-model 306 may receive one or more inferences from the vulnerable road user understanding sub-model 304. For example, interactions/relationships understanding sub-model as the other understanding sub-model 306 may receive one or more inferences relating to gaze attributes, and/or intent attributes. The interactions/relationships understanding sub-model may produce understanding information 360 to the prediction part 106 or planning part 110.

The other understanding sub-model 306 may be a traffic directives understanding sub-model, which may process sensor data and/or other information to understand situations on the road such as (temporary) traffic restrictions, construction zones, emergency traffic restrictions, emergency or law enforcement personnel, persons directing traffic, etc. The other understanding sub-model 306 may receive one or more inferences from the vulnerable road user understanding sub-model 304. For example, a traffic directives understanding sub-model as the other understanding sub-model 306 may receive one or more inferences relating to human controlling traffic subtype classifications, extract human controlling traffic attributes, and extract human controlling traffic gesture attributes. The traffic directives understanding sub-model may produce one or more traffic directives (as understanding information 360) to the planning part 110.

In some embodiments, tracking part 202 may produce bounding boxes of tracked objects in the environment of the vehicle. The bounding boxes of tracked objects can be provided to the understanding part 204. The sensor data 344 at the input of vulnerable road user understanding sub-model 304 from the sensors corresponding to the tracked objects having the unknown object classification may be cropped. For example, sensor data 344 may include camera images cropped based on projections of bounding boxes of the tracked objects having the vulnerable road user classification onto camera images captured by the sensors. Processing cropped images (as opposed to full images) can reduce computational complexity.

In some embodiments, the inferences of the understanding part 204 (e.g., inferences from main understanding model 302, inferences from vulnerable road user understanding sub-model, and inferences from other understanding sub-model 306) can be provided to the tracking part 202. Inferences may be provided as classes and attributes 250 to tracking part 202. Tracking part 202 may be a collector for classes and attributes of various tracked objects.

Prediction part 106 may receive at least one of the inferences generated by the plurality of heads and to predict behaviors of tracked objects in an environment of the vehicle. Expected behaviors and movements of road objects can be different depending on the subtype of vulnerable road user and/or attributes of vulnerable road users. Some inferences such as intent, gaze, attention, whether a pedestrian has fallen, whether the tracked object is a human controlling traffic, etc., may impact how prediction part 106 predicts future pose and future kinematics of various types of tracked objects.

Planning part 110 may receive at least one of the inferences generated by the plurality of heads (or other models in understanding part 204) and to generate a trajectory for the vehicle. Some inferences such as intent, whether a pedestrian is lying on the road, whether the tracked object is gesturing to slow down, etc., may impact how planning part 110 generates planned paths for the AV. Planning part 110 may plan a path that has the AV following instructions from a human controlling traffic.

Figure 4:
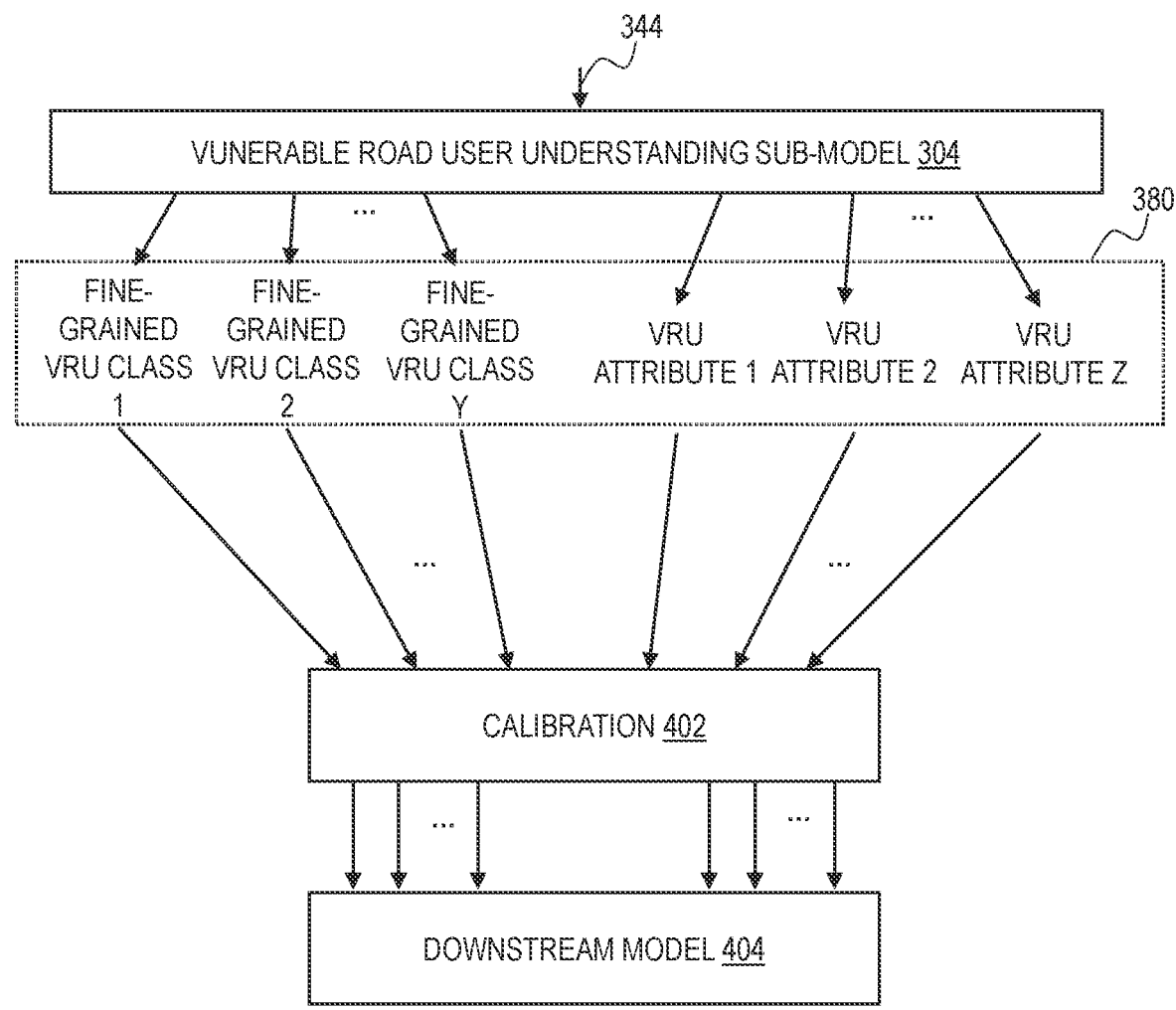
FIG. 4 illustrates an exemplary vulnerable road user understanding sub-model 304, an exemplary calibration part 402, and an exemplary downstream model 404, according to some aspects of the disclosed technology.

Various machine learning models may be consuming inferences produced by the vulnerable road user understanding sub-model 304. FIG. 4 illustrates an exemplary vulnerable road user understanding sub-model 304, an exemplary calibration part 402, and an exemplary downstream model 404, according to some aspects of the disclosed technology. Downstream model 404 may represent one or more machine learning models that may be consuming inferences produced by vulnerable road user understanding sub-model 304. Downstream model 404 may be a part of understanding part 204. Downstream model 404 may be a part of prediction part 106. Downstream model 404 may be a part of planning part 110. The inferences, e.g., vulnerable road user subtype classifications, may include a probability that a tracked object belongs to or matches a certain vulnerable road user subtype classification, and a confidence estimate associated with the probability or classification result. The confidence estimate may indicate how likely the vulnerable road user understanding sub-model 304 is correct or incorrect. Downstream model 404 may make certain decisions to use or not use certain classification results, or rely on certain classification results more or less, depending on the confidence estimate. The vulnerable road user understanding sub-model 304 may be updated through additional training of the vulnerable road user understanding sub-model 304, and/or updates to the architecture or configuration of the vulnerable road user understanding sub-model 304. Through these updates, the probability distributions of the confidence estimates may change. Downstream model 404 may expect the confidence estimate probability distributions to remain the same after an updated model is deployed onto the vehicle. In some cases, the vulnerable road user understanding sub-model 304 may be overconfident and may not reflect ground truth correctness likelihood. For these reasons, a calibration part 402 may be included (e.g., as part of understanding part 204) to correct confidence estimates of inferences output by the heads of the vulnerable road user understanding sub-model 304. Confidence estimates of the output inferences produced by the vulnerable road user understanding model may be post-processed by calibration part 402 to calibrate for deviations between model updates and/or over confidence issues. Post-processing may include temperature scaling to calibrate the confidence estimates. The amount of scaling being applied by temperature scaling may be determined through a golden-search optimization technique. Calibration part 402 may output calibrated confidence estimates to downstream model 404.

Figure 5:
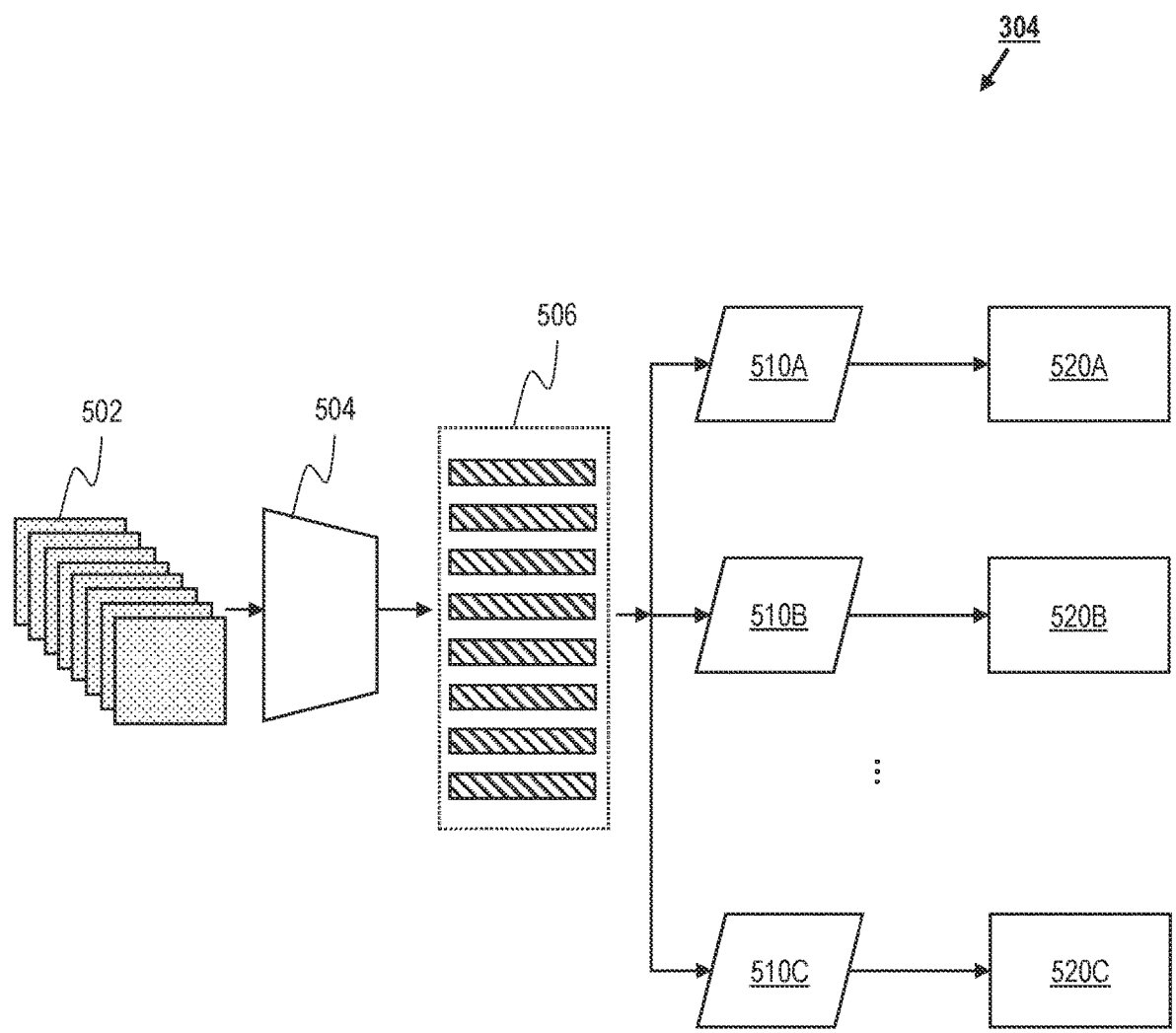
FIG. 5 illustrates an exemplary architecture for the vulnerable road user understanding sub-model 304, according to some aspects of the disclosed technology.
Figure 6:
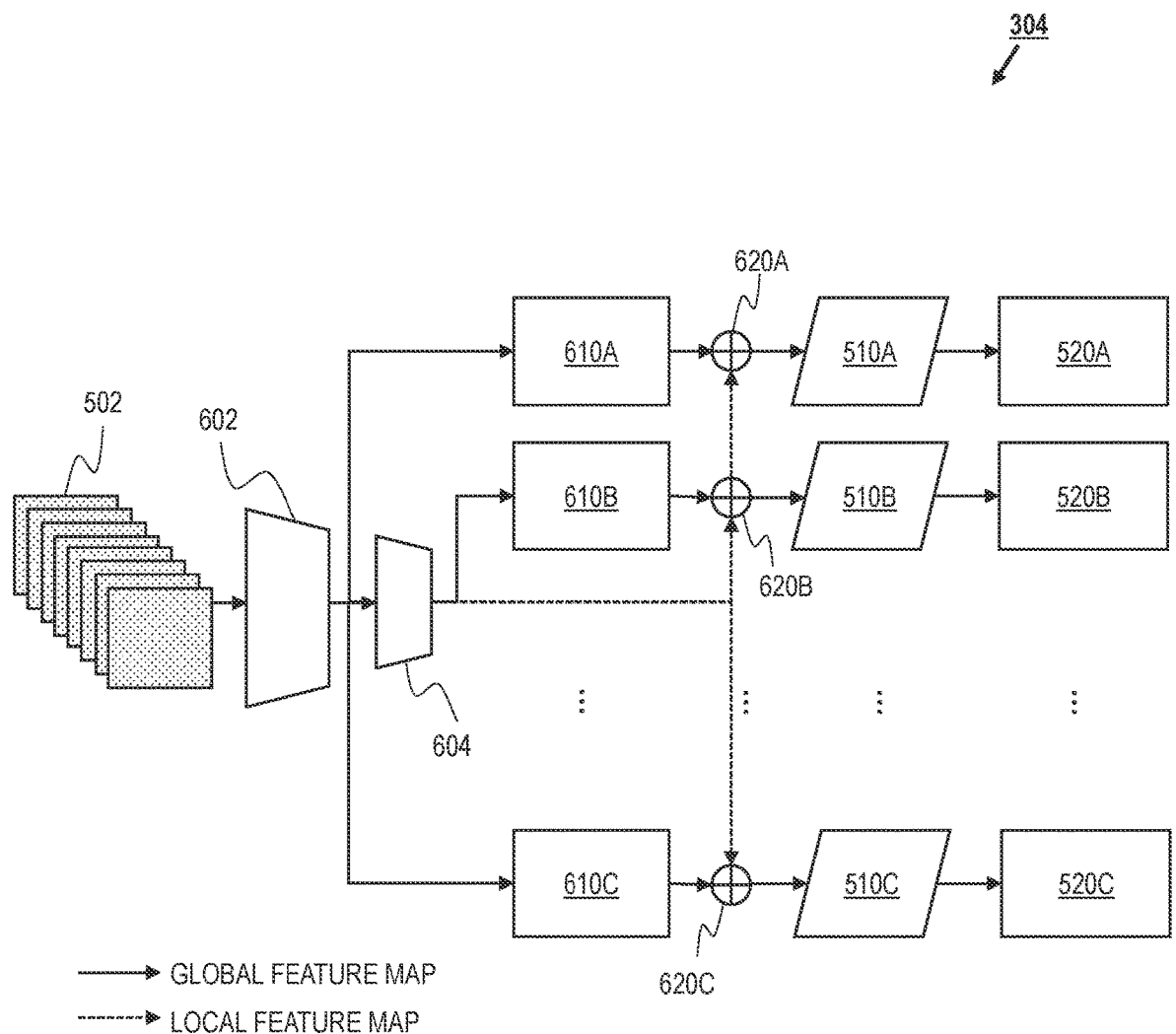
FIG. 6 illustrates another exemplary architecture for the vulnerable road user understanding sub-model 304, according to some aspects of the disclosed technology.

Exemplary Multi-Task Learning Architectures for Vulnerable Road User Understanding Model The vulnerable road user understanding model, such as the vulnerable road user understanding sub-model 304 of FIG. 3, can be implemented as a multi-task learning model. FIG. 5 illustrates an exemplary architecture for the vulnerable road user understanding sub-model 304, according to some aspects of the disclosed technology. FIG. 6 illustrates another exemplary architecture for the vulnerable road user understanding sub-model 304, according to some aspects of the disclosed technology. In FIGS. 5-6, the architecture of the multi-task learning model may include shared layers (e.g., a shared backbone), task group specific temporal networks, and task group specific layers (e.g., heads, spatial networks, etc.).

In FIGS. 5-6, the task group specific layers or heads are shown as first heads 520A, second heads 520B, and third heads 520C. The task group specific heads may output inferences for respective task groups. The inferences may include one or more vulnerable road user subtype classifications and one or more vulnerable road user attributes. A given task group specific layers or heads have an output layer that can generate these inferences (e.g., as numerical values). The task group specific layers or heads may include deep neural networks. Task group specific layers may include fully connected neural network layers with output nodes to output inferences for the respective task groups. First heads 520A may be dedicated to a first task group. Second heads 520B may be dedicated to a second task group. Third heads 520C may be dedicated to a third task group. The three task groups are distinct. First heads 520A may include fully connected neural network layers with heads or output nodes to output vulnerable road user subtype (or fine grain) classifications, fall attributes, and gaze attributes. Second heads 520B may include fully connected neural network layers with heads or output nodes to output human controlling traffic subtype classifications and/or attributes, and gesture attributes. Third heads 520C may include fully connected neural network layers with heads or output nodes to output intent attributes.

The shared layers or shared backbone can be shared across all tasks and task groups. In FIG. 5, the shared layers or shared backbone includes a spatial network 504. In FIGS. 5-6, the shared backbone can receive and process sensor data 502 generated from the sensors corresponding to tracked objects having the vulnerable road user classification. In some cases, the shared backbone may receive and process sensor data 502 generated from the sensors corresponding to tracked objects (and not restricted to ones which have the vulnerable road user classification).

The shared layers or the shared backbone may include a deep neural network, such as multi-layer perceptrons, convolutional neural networks, and recurrent neural networks. The shared backbone may include a residual neural network, which can be advantageous for training and processing sensor data having camera image frames. The shared backbone may include a neural network to extract spatial features of input sensor data 502. Sensor data 502 may include camera image frames or sequences of camera images. Sensor data 502 may include other types of sensor data generated by sensor systems 804, 806, and 808 of FIG. 8.

The spatial network 504 may generate a spatial map for each camera image received as sensor data 502. The spatial network 504 may generate multiple spatial maps for a sequence of camera images received as sensor data 502. The spatial maps may be vectorized, which is shown as vectorized spatial maps 506, which may correspond to a sequence of (camera) image frames provided as the sensor data 502 to the shared backbone, e.g., spatial network 504.

Because some vulnerable road user subtype classifications and/or vulnerable road user attributes may have dynamic features, may have certain characteristic kinematics, or may rely on features that may be observable over a period of time, one or more temporal layers (e.g., temporal networks) may be included between the shared backbone and the heads. Specifically, the multi-task learning model architecture may include task group specific temporal layers that may be dedicated and implemented to extract temporal features for a task group. Tasks of the same task group may share the same temporal network. Temporal layers may help the vulnerable road user understanding model to learn features that are dynamic or learn kinematic features (across multiple frames of input data) to improve performance of the task group. Ability to learn these features for a given task group can help with task groups that involve extracting vulnerable road user attributes, such as intent attributes, gesture attributes, fall attributes, etc.

A temporal network may include a recurrent neural network. A temporal network may include a long short-term memory network. Depending on the task group, a temporal network may or may not be needed or implemented. Depending on the task group, the temporal network upstream of the task group specific heads may be configured differently (e.g., omitting an input gate, omitting a forget gate, omitting an output gate, omitting an input activation function, omitting an output activation function, coupled input and forget gate, no peepholes, full gate recurrence, varying sequence length, etc.). Temporal networks may be configured differently to learn features that occur over a longer or shorter period of time, or over a longer or shorter sequence of frames.

Ensuring tasks are grouped may help to reduce computational complexity because temporal networks can be computationally expensive. By grouping tasks into task groups, the architecture can dedicate temporal networks to task groups as opposed to each task. Implementing multiple temporal networks dedicated to different task groups also allow the individual temporal networks to be tuned for the task group to improve performance of the task group while ensuring that computational resources are not spent on task groups that do not require them for the same performance.

In FIG. 5, a first temporal network 510A may be provided downstream of the spatial network 504 and in front of the first heads 520A, to extract temporal features for the first task group. The first temporal network 510A may receive and process vectorized spatial maps 506. A second temporal network 510B may be provided downstream of the spatial network 504 and in front of the second heads 520B, to extract temporal features for the second task group. The second temporal network 510B may receive and process vectorized spatial maps 506. A third temporal network 510C may be provided downstream of the spatial network 504 and in front of the third heads 520C, to extract temporal features for the third task group. The third temporal network 510C may receive and process vectorized spatial maps 506.

In some embodiments, temporal networks may be implemented to have different sequence lengths (or different number of time steps). Sequence length may impact the computational complexity of the temporal network (the longer the sequence length, the higher the computational complexity). The temporal network may be arranged to process an input sequence having the configured sequence length. Temporal networks may be implemented to receive and process an input sequence of a certain length. In FIGS. 5-6, the input sequence may correspond to a number of (vectorized) spatial maps being provided as input to a temporal network. One temporal network may have a first sequence length, and another temporal network may have a second sequence length, where the second sequence length is different from the first sequence length. Sequence length may be decided based on the task group. For example, the first temporal network 510A may be dedicated to a first task group involving extraction of vulnerable road user subtype classifications, and the second temporal network 510B may be dedicated to a second task group involving extraction of one or more of: intent attributes, human controlling traffic gesture attributes, and fall attributes. The sequence length of the first temporal network 510A may be shorter than the sequence length of the second temporal network 510B.

In FIG. 6, the shared layers or shared backbone includes first layers 602 (or a first spatial network) and second layers 604 (or a second spatial network) that is downstream of the first layers. The first layers 602 and the second layers 604 may form a full spatial network and serve as the shared backbone of the multi-task learning model. The first layers 602 may generate local spatial maps or local feature maps (e.g., features in the intermediate convolutional layers of the shared backbone). A local spatial map corresponding to an input image may include information or features which depend on the local context of the input image. The second layers 604 may receive and process the local feature maps, to generate global spatial maps or global feature maps. A global spatial map corresponding to an input image may include information or features which depend on the global context of the input image. For some task groups, having access to both or a selected one of the local spatial maps and the global spatial maps may improve the performance of the task groups.

In some embodiments, the local feature maps may be processed by one or more spatial networks dedicated to one or more respective task groups. A task group specific spatial network may receive and process local spatial maps from first layers 602 of the shared backbone and may generate task group specific spatial maps. In FIG. 6, a first spatial network 610A dedicated to a first task group may be provided to receive local spatial maps from first layers 602 and to generate spatial maps specific for the first task group. The spatial maps specific for the first task group may be concatenated with or added to global spatial maps by adder 620A to form (vectorized) spatial maps to be processed by the first temporal network 510A. A second spatial network 610B dedicated to a second task group may be provided to receive local spatial maps from first layers 602 and to generate spatial maps specific for the second task group. The spatial maps specific for the second task group may be concatenated with or added to global spatial maps by adder 620B to form (vectorized) spatial maps to be processed by the second temporal network 510B. A third spatial network 610C dedicated to a third task group may be provided to receive local spatial maps from first layers 602 and to generate spatial maps specific for the third task group. The spatial maps specific for the second task group may be concatenated with or added to global spatial maps by adder 620C to form (vectorized) spatial maps to be processed by the third temporal network 510C. Task group specific spatial networks may learn task group specific spatial features from the local feature maps and may improve performance for the specific task group.

In some embodiments, task group specific temporal networks (e.g., first temporal network 510A, second temporal network 510B, and third temporal network 510C) may receive and process a suitable set of (vectorized) spatial maps having one or more of: local spatial maps, global spatial maps, task specific spatial maps. For instance, at least one or more of the task group specific temporal networks (e.g., first temporal network 510A, second temporal network 510B, and third temporal network 510C) may receive task group specific spatial maps and global spatial maps corresponding to a sequence of image frames provided as the sensor data 502 to the shared backbone having the first layers 602 and the second layers 604.

Exemplary Method for Understanding Vulnerable Road Users

Figure 7:
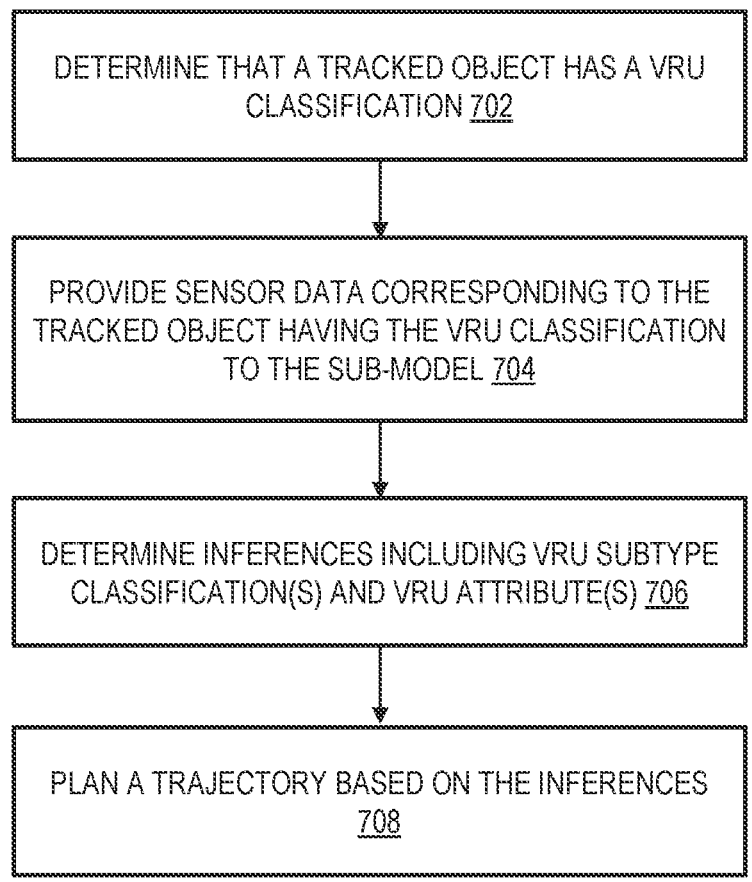
FIG. 7 illustrates an exemplary method for understanding vulnerable road users and controlling a vehicle based on the understanding, according to some aspects of the disclosed technology.

FIG. 7 illustrates an exemplary method for understanding vulnerable road users and controlling a vehicle based on the understanding, according to some aspects of the disclosed technology. The method may be carried out by components illustrated in the figures. While not shown, a tracker such as tracking part 202 may be implemented to track objects in sensor data. In 702, a main understanding model, e.g., main understanding model 302 of FIG. 3) may determine that a tacked object has a vulnerable road user classification. In 704, sensor data corresponding to the tracked object having the vulnerable road user classification may be provided to a sub-model, e.g., vulnerable road user understanding sub-model 304 of the figures. In 706, the sub-model may determine a plurality of inferences based on the sensor data. The inferences may include one or more vulnerable road user subtype classifications and one or more vulnerable road user attributes. Determining the inferences may include processing the sensor data using a shared backbone, processing global spatial maps by temporal networks dedicated to respective task groups, and generating inferences based on respective outputs of the temporal networks by heads that are dedicated to the respective task groups. Exemplary architectures for implementing a model to determine the inferences are described with FIGS. 5-6. In 708, a planner may plan a trajectory of the vehicle based on the inferences. Various ways the inferences may impact the vehicle are described with FIGS. 1-4.

In some embodiments, the main model may produce a (coarse) road user inference that selects between different (coarse) road user classifications.

In some embodiments, the sensor data corresponding to the tracked object having the vulnerable road user classification comprises an image cropped based on a projection of a bounding box corresponding to the tracked object onto a camera image.

In some embodiments, determining the plurality of inferences in 706 may include processing local spatial maps by one or more spatial networks dedicated to at least one or more respective task groups, and generating task group specific spatial maps by the one or more spatial networks. The architecture illustrated in FIG. 6 may utilize local spatial maps. The temporal networks dedicated to respective task groups may further process the task group specific spatial maps along with the global spatial maps. The architecture illustrated in FIG. 6 may combine the task group specific spatial maps and the global spatial maps.

Exemplary AV Management System

Turning now to FIG. 8, this figure illustrates an example of an AV management system 800, in which some of the aspects of the present disclosure can be implemented. One of ordinary skill in the art will understand that, for the AV management system 800 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 130, a data center 850, and a client computing device 870. The AV 130, the data center 850, and the client computing device 870 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 130 may navigate about roadways without a human driver based on sensor signals generated by multiple sensor systems 804, 806, and 808. The sensor systems 804-808 may include different types of sensors and may be arranged about the AV 130. For instance, the sensor systems 804-808 may comprise Inertial Measurement Units (IMUs), cameras (e.g., still image cameras, video cameras, thermal cameras, signal cameras, etc.), light sensors (e.g., light detecting and ranging (LIDAR) systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), time-of-flight sensors, structured light sensor, infrared sensors, signal light sensors, thermal imaging sensors, engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 may be a camera system, the sensor system 806 may be a LIDAR system, and the sensor system 808 may be a RADAR system. Other embodiments may include any other number and type of sensors.

AV 130 may also include several mechanical systems that may be used to maneuver or operate AV 130. For instance, mechanical systems may include vehicle propulsion system 830, braking system 832, steering system 834, safety system 836, and cabin system 838, among other systems. Vehicle propulsion system 830 may include an electric motor, an internal combustion engine, or both. The braking system 832 may include an engine brake, a wheel braking system (e.g., a disc braking system that utilizes brake pads), hydraulics, actuators, and/or any other suitable componentry configured to assist in decelerating AV 130. The steering system 834 may include suitable componentry configured to control the direction of movement of the AV 130 during navigation. Safety system 836 may include lights and signal indicators, a parking brake, airbags, and so forth. The cabin system 838 may include cabin temperature control systems, in-cabin entertainment systems, and so forth. In some embodiments, the AV 130 may not include human driver actuators (e.g., steering wheel, handbrake, foot brake pedal, foot accelerator pedal, turn signal lever, window wipers, etc.) for controlling the AV 130. Instead, the cabin system 838 may include one or more client interfaces (e.g., GUIs, Voice User Interfaces (VUIs), etc.) for controlling certain aspects of the mechanical systems 830-838.

AV 130 may additionally include a local computing device 810 that is in communication with the sensor systems 804-808, the mechanical systems 830-838, the data center 850, and the client computing device 870, among other systems. The local computing device 810 may include one or more processors and memory, including instructions that may be executed by the one or more processors. The instructions may make up one or more software stacks or components responsible for controlling the AV 130; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception, understanding, and tracking part 104, a mapping and localization stack 814, a prediction part 106, a planning part 110, and controls part 112, a communications stack 820, an HD geospatial database 822, and an AV operational database 824, among other stacks and systems.

Perception, understanding, and tracking part 104 may enable the AV 130 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception, understanding, and tracking part 104 may detect and classify objects and determine their current and predicted locations, speeds, directions, and the like. In addition, the perception, understanding, and tracking part 104 may determine the free space around the AV 130 (e.g., to maintain a safe distance from other objects, change lanes, park the AV, etc.). The perception, understanding, and tracking part 104 may also identify environmental uncertainties, such as where to look for moving objects, flag areas that may be obscured or blocked from view, and so forth. Exemplary implementations of perception, understanding, and tracking part 104 are illustrated in the figures.

Prediction part 106 may predict behaviors and movements of tracked objects sensed by perception, understanding, and tracking part 104.

Mapping and localization stack 814 may determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 130 may compare sensor data captured in real-time by the sensor systems 804-808 to data in the HD geospatial database 822 to determine its precise (e.g., accurate to the order of a few centimeters or less) position and orientation. The AV 130 may focus its search based on sensor data from one or more first sensor systems (e.g., GPS) by matching sensor data from one or more second sensor systems (e.g., LIDAR). If the mapping and localization information from one system is unavailable, the AV 130 may use mapping and localization information from a redundant system and/or from remote data sources.

Planning part 110 may determine how to maneuver or operate the AV 130 safely and efficiently in its environment. For instance, the planning part 110 may produce a plan for the AV 130, which can include a (reference) trajectory. Planning part 110 may receive information generated by perception, understanding, and tracking part 104. For example, the planning part 110 may receive the location, speed, and direction of the AV 130, geospatial data, data regarding objects sharing the road with the AV 130 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), user input, and other relevant data for directing the AV 130 from one point to another. The planning part 110 may determine multiple sets of one or more mechanical operations that the AV 130 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events.

Controls part 112 may manage the operation of the vehicle propulsion system 830, the braking system 832, the steering system 834, the safety system 836, and the cabin system 838. Controls part 112 may receive a plan from the planning part 110. Controls part 112 may receive sensor signals from the sensor systems 804-808 as well as communicate with other stacks or components of the local computing device 810 or a remote system (e.g., the data center 850) to effectuate the operation of the AV 130. For example, controls part 112 may implement the final path or actions from the multiple paths or actions provided by the planning part 110. The implementation may involve turning the plan from the planning part 110 into commands for vehicle hardware controls such as the actuators that control the AV's steering, throttle, brake, and drive unit.

The communication stack 820 may transmit and receive signals between the various stacks and other components of the AV 130 and between the AV 130, the data center 850, the client computing device 870, and other remote systems. The communication stack 820 may enable the local computing device 810 to exchange information remotely over a network. Communication stack 820 may also facilitate local exchange of information, such as through a wired connection or a local wireless connection.

The HD geospatial database 822 may store HD maps and related data of the streets upon which the AV 130 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 824 may store raw AV data generated by the sensor systems 804-808 and other components of the AV 130 and/or data received by the AV 130 from remote systems (e.g., the data center 850, the client computing device 870, etc.). In some embodiments, the raw AV data may include HD LIDAR point cloud data, image or video data, RADAR data, GPS data, and other sensor data that the data center 850 may use for creating or updating AV geospatial data as discussed further below with respect to FIG. 5 and elsewhere in the present disclosure.

Data center 850 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 850 may include one or more computing devices remote to the local computing device 810 for managing a fleet of AVs and AV-related services. For example, in addition to managing the AV 130, the data center 850 may also support a ridesharing service, a delivery service, a remote/roadside assistance service, street services (e.g., street mapping, street patrol, street cleaning, street metering, parking reservation, etc.), and the like.

The data center 850 may send and receive various signals to and from the AV 130 and the client computing device 870. These signals may include sensor data captured by the sensor systems 804-808, roadside assistance requests, software updates, ridesharing pick-up and drop-off instructions, and so forth. In this example, the data center 850 includes one or more of a data management platform 852, an Artificial Intelligence/Machine Learning (AI/ML) platform 854, a remote assistance platform 858, a ridesharing platform 860, and a map management platform 862, among other systems.

Data management platform 852 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 850 may access data stored by the data management platform 852 to provide their respective services.

The AI/ML platform 854 may provide the infrastructure for training and evaluating machine learning algorithms for operating the AV 130, the remote assistance platform 858, the ridesharing platform 860, the map management platform 862, and other platforms and systems. Using the AI/ML platform 854, data scientists may prepare data sets from the data management platform 852; select, design, and train machine learning models; evaluate, refine, and deploy the models; maintain, monitor, and retrain the models; and so on.

The remote assistance platform 858 may generate and transmit instructions regarding the operation of the AV 130. For example, in response to an output of the AI/ML platform 854 or other system of the data center 850, the remote assistance platform 858 may prepare instructions for one or more stacks or other components of the AV 130.

The ridesharing platform 860 may interact with a customer of a ridesharing service via a ridesharing application 872 executing on the client computing device 870. The client computing device 870 may be any type of computing system, including a server, desktop computer, laptop, tablet, smartphone, smart wearable device (e.g., smart watch; smart eyeglasses or other Head-Mounted Display (HMD); smart car pods or other smart in-car, on-car, or over-car device; etc.), gaming system, or other general-purpose computing device for accessing the ridesharing application 872. The client computing device 870 may be a customer's mobile computing device or a computing device integrated with the AV 130 (e.g., the local computing device 810). The ridesharing platform 860 may receive requests to be picked up or dropped off from the ridesharing application 872 and dispatch the AV 130 for the trip.

Map management platform 862 may provide a set of tools for the manipulation and management of geographic and spatial (geospatial) and related attribute data. The data management platform 852 may receive LIDAR point cloud data, image data (e.g., still image, video, etc.), RADAR data, GPS data, and other sensor data (e.g., raw data) from one or more AVs 130, Unmanned Aerial Vehicles (UAVs), satellites, third-party mapping services, and other sources of geospatially referenced data.

In some embodiments, the map viewing services of map management platform 862 may be modularized and deployed as part of one or more of the platforms and systems of the data center 850. For example, the AI/ML platform 854 may incorporate the map viewing services for visualizing the effectiveness of various object detection or object classification models, the remote assistance platform 858 may incorporate the map viewing services for replaying traffic incidents to facilitate and coordinate aid, the ridesharing platform 860 may incorporate the map viewing services into the client application 872 to enable passengers to view the AV 130 in transit enroute to a pick-up or drop-off location, and so on.

Exemplary Processor-Based System

Figure 9:
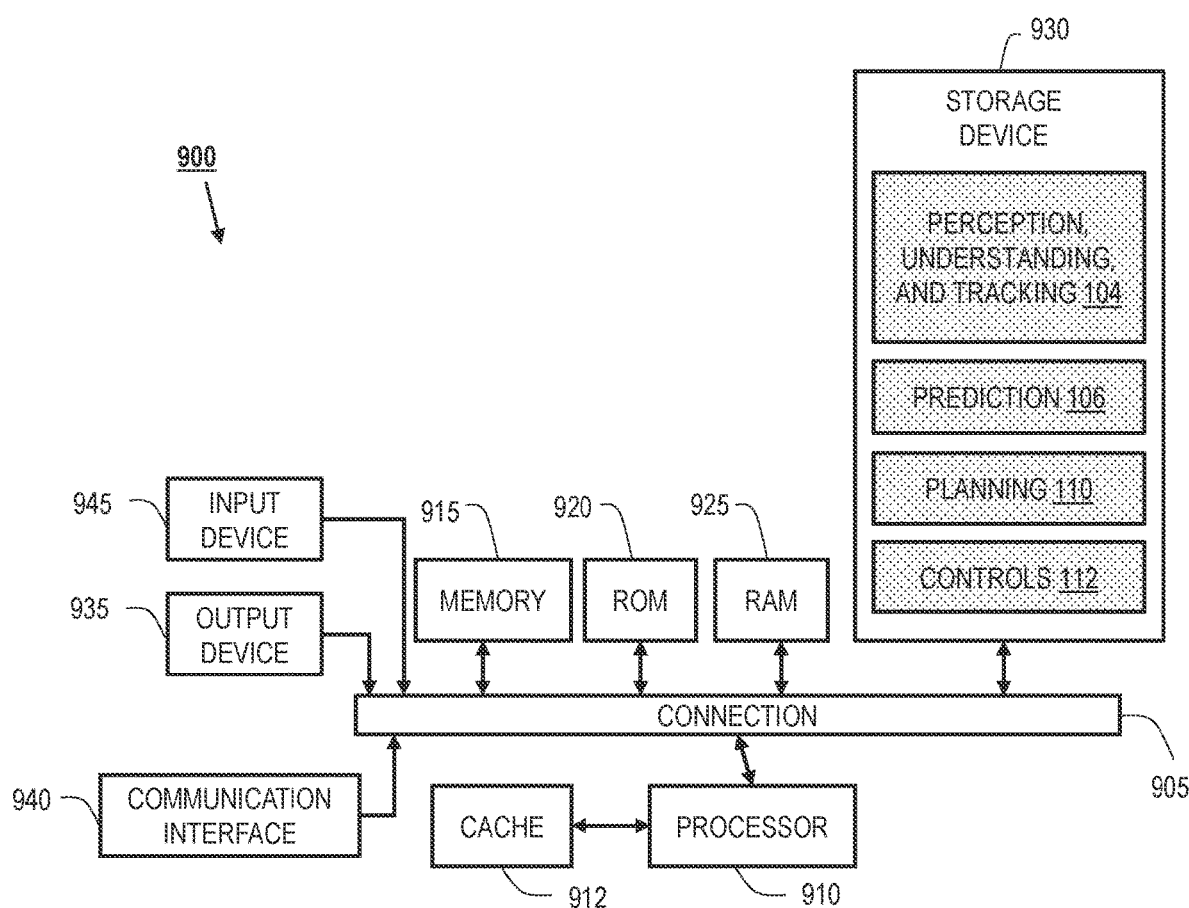
FIG. 9 illustrates an exemplary computing system with which some aspects of the subject technology may be implemented.

FIG. 9 illustrates an exemplary computing system with which some aspects of the subject technology may be implemented. For example, processor-based system 900 may be any computing device making up, or any component thereof in which the components of the system are in communication with each other using connection 905. Connection 905 may be a physical connection via a bus, or a direct connection into processor 910, such as in a chipset architecture. Connection 905 may also be a virtual connection, networked connection, or logical connection.

In some embodiments, computing system 900 represents the local computing device 810 of FIG. 8. In some embodiments, one or more of the described system components represents many such components each performing some or all of the function for which the component is described. In some embodiments, the components may be physical or virtual devices.

Exemplary system 900 includes at least one processor 910 and connection 905 that couples various system components including system memory 915, such as Read-Only Memory (ROM) 920 and Random-Access Memory (RAM) 925 to processor 910. at least one processor 910 may include one or more of: Central Processing Unit (CPU), Graphical Processing Unit (GPU), machine learning processor, neural network processor, or some other suitable computing processor. Computing system 900 may include a cache of high-speed memory 912 connected directly with, in close proximity to, or integrated as part of processor 910.

Processor 910 may include any general-purpose processor and a hardware service or software service. Processor 910 may essentially be a completely self-contained computing system, containing multiple cores or processors, a bus, memory controller, cache, etc. A multi-core processor may be symmetric or asymmetric.

Storage device 930 may be a non-volatile and/or non-transitory and/or computer-readable memory device and may be a hard disk or other types of computer-readable media which may store data that is accessible by a computer.

Storage device 930 may include software services, servers, services, etc., that when the code that defines such software is executed by the processor 910, it causes the system 900 to perform a function. Storage device 930 may store instructions that encode functionalities of perception, understanding, and tracking part 104, prediction part 106, planning part 110, and controls part 112. In some embodiments, a hardware service that performs a particular function may include the software component stored in a computer-readable medium in connection with the necessary hardware components, such as processor 910, connection 905, output device 935, etc., to carry out the function.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms known to those of skill in the art. In some instances, multimodal systems may enable a user to provide multiple types of input/output to communicate with computing system 900. Computing system 900 may include communications interface 940, which may generally govern and manage the user input and system output. The communication interface may perform or facilitate receipt and/or transmission of wired or wireless communications via wired and/or wireless transceivers.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a vehicle comprising: sensors; one or more processors; and one or more storage media encoding instructions executable by the one or more processors to implement an understanding part, wherein the understanding part includes: a main understanding model to classify a tracked object into at least one of: one or more road user classifications and a vulnerable road user classification; and a sub-model to output inferences for a plurality of task groups, the sub-model including: a shared backbone to receive and process sensor data generated from the sensors corresponding to tracked objects having the vulnerable road user classification; temporal networks dedicated to respective task groups; and heads to output inferences for the respective task groups, wherein the inferences include one or more vulnerable road user subtype classifications and one or more vulnerable road user attributes.

In Example 2, the vehicle of Example 1 can optionally include the task groups comprising: a first task group to extract vulnerable road user subtype classifications, extract whether a pedestrian has fallen, and extract gaze attributes.

In Example 3, the vehicle of Example 1 or 2 can optionally include the task groups comprising: a second task group to extract human controlling traffic subtype classifications and/or attributes, and extract human controlling traffic gesture attributes.

In Example 4, the vehicle of any one of Examples 1-3 can optionally include the task groups comprising: a third task group to extract vulnerable road user intent attributes.

In Example 5, the vehicle of any one of Examples 1-4 can optionally include the shared backbone comprising a deep neural network.

In Example 6, the vehicle of any one of Examples 1-5 can optionally include the temporal networks comprising long short-term memory neural networks.

In Example 7, the vehicle of any one of Examples 1-6 can optionally include the temporal networks comprising a first temporal network having a first sequence length, and a second temporal network having a second sequence length that is different from the first sequence length.

In Example 8, the vehicle of Example 7 can optionally include the first temporal network being dedicated to a first task group to extract vulnerable road user subtype classifications, and the second temporal network being dedicated to a second task group to extract human controlling traffic gesture attributes.

In Example 9, the vehicle of any one of Examples 1-8 can optionally include the temporal networks receiving vectorized spatial maps corresponding to a sequence of image frames provided as the sensor data to the shared backbone.

In Example 10, the vehicle of any one of Examples 1-9 can optionally include the shared backbone comprising: first layers to generate local spatial maps; and second layers downstream of first layers to generate global spatial maps.

In Example 11, the vehicle of Example 10 can optionally include the sub-model further including one or more spatial networks dedicated to one or more respective task groups to receive the local spatial maps from first layers of the shared backbone and to generate task group specific spatial maps.

In Example 12, the vehicle of Example 10 or 11 can optionally include at least one or more of the temporal networks receiving task group specific spatial maps and global spatial maps corresponding to a sequence of image frames provided as the sensor data to the shared backbone.

In Example 13, the vehicle of any one of Examples 1-12 can optionally include the heads comprising fully connected neural network layers for the respective task groups.

In Example 14, the vehicle of any one of Examples 1-13 can optionally include the understanding part further including a calibration part to correct confidence estimates of inferences output by the heads.

In Example 15, the vehicle of any one of Examples 1-14 can optionally include: the one or more storage encoding instructions executable by the one or more processors further implementing a planning part; the understanding part further including a traffic directives understanding sub-model; and the traffic directive sub-model part receiving one or more inferences relating to human controlling traffic subtype classifications and/or attributes, and gesture attributes, and producing one or more traffic directives to the planning part.

In Example 16, the vehicle of any one of Examples 1-15 can optionally include the one or more storage encoding instructions executable by the one or more processors further implementing a prediction part to receive at least one of the inferences generated by the heads, and to predict behaviors of tracked objects in an environment of the vehicle based on the at least one of the inferences.

In Example 17, the vehicle of any one of Examples 1-16 can optionally include the one or more storage encoding instructions executable by the one or more processors further implementing a planning part to receive at least one of the inferences generated by the plurality of heads and to generate a trajectory for the vehicle based on the at least one of the inferences.

Example 18 is a computer-implemented method for understanding vulnerable road users and controlling a vehicle based on the understanding, the method comprising: determining, by a main understanding model, that a tracked object has a vulnerable road user classification; providing sensor data corresponding to the tracked object having the vulnerable road user classification to a sub-model; determining, by the sub-model, a plurality of inferences based on the sensor data, wherein: determining the plurality of inferences comprises: processing the sensor data using a shared backbone; processing global spatial maps by temporal networks dedicated to respective task groups; and generating inferences based on respective outputs of the temporal networks by heads that are dedicated to the respective tasks groups; and the inferences include one or more vulnerable road user subtype classifications and one or more vulnerable road user attributes; and planning a trajectory of the vehicle based on the inferences.

In Example 19, the computer-implemented method of Example 18 can optionally include the main understanding model producing a road user inference that selects between different road user classifications.

In Example 20, the computer-implemented method of Example 18 or 19 can optionally include the sensor data corresponding to the tracked object having the vulnerable road user classification comprising an image cropped based on a projection of a bounding box corresponding to the tracked object onto a camera image.

In Example 21, the computer-implemented method of any one of Examples 18-20 can optionally include determining the plurality of inferences further comprising: processing local spatial maps by one or more spatial networks dedicated to at least one or more respective task groups; and generating task group specific spatial maps by the one or more spatial networks.

In Example 22, the computer-implemented method of Example 21 can optionally include the temporal networks dedicated to respective task groups further processing the task group specific spatial maps along with the global spatial maps.

In Example 23, the computer-implemented method of any one of Examples 18-22 can optionally include the temporal networks being configured to process different number of global spatial maps as input.

In Example 24, the computer-implemented method of any one of Examples 18-23 can optionally include: providing one or more inferences to a traffic directives understanding part.

In Example 25, the computer-implemented method of any one of Examples 18-24 can optionally include: providing one or more inferences to a prediction part.

Example 26 includes one or more non-transient storage media encoding instructions executable by the one or more processors to implement an understanding part, wherein the understanding part includes: a shared backbone to receive and process sensor data generated from sensors of a vehicle corresponding to tracked objects having the vulnerable road user classification; temporal networks dedicated to respective task groups; and heads to output inferences for the respective task groups, wherein the inferences include one or more vulnerable road user subtype classifications and one or more vulnerable road user attributes.

In Example 27, the one or more non-transient storage media of Example 26 can optionally include the temporal networks comprising a first temporal network having a first sequence length, and a second temporal network having a second sequence length that is different from the first sequence length.

In Example 28, the one or more non-transient storage media of Example 26 or 27 can optionally include the shared backbone comprising: first layers to generate local spatial maps; and second layers downstream of first layers to generate global spatial maps.

In Example 29, the one or more non-transient storage media of Example 28 can optionally include the sub-model further including one or more spatial networks dedicated to one or more respective task groups to receive the local spatial maps from first layers of the shared backbone and to generate task group specific spatial maps.

In Example 30, the one or more non-transient storage media of Example 28 or 29 can optionally include at least one or more of the temporal networks receiving task group specific spatial maps and global spatial maps corresponding to a sequence of image frames provided as the sensor data to the shared backbone.

Example 31 includes one or more non-transitory computer-readable media storing instructions that, when executed by one or more processors, cause the one or more processors to perform any one of the computer-implemented methods of Examples 18-25.

Example 32 is an apparatus comprising means to carry out any one of the computer-implemented methods of Examples 18-25.

What is claimed is:

1. A vehicle comprising:
   sensors;
   one or more processors; and
   one or more storage media encoding instructions executable by the one or more processors to implement an understanding part, wherein the understanding part includes:
      a main understanding model to classify a tracked object into at least one of: one or more road user classifications and a vulnerable road user classification; and
      a sub-model to output inferences for a plurality of task groups, the sub-model including:
         a shared backbone to receive and process sensor data generated from the sensors corresponding to tracked objects having the vulnerable road user classification;
         temporal networks dedicated to respective task groups; and
         heads to output inferences for the respective task groups, wherein the inferences include one or more vulnerable road user subtype classifications and one or more vulnerable road user attributes, wherein the instructions are executable by the one or more processors to implement a planning part configured to plan a trajectory of the vehicle based on the inferences.

2. The vehicle of claim 1, wherein the task groups comprise:
   a first task group to extract vulnerable road user subtype classifications, extract whether a pedestrian has fallen, and extract gaze attributes.

3. The vehicle of claim 1, wherein the task groups comprise:
   a second task group to extract human controlling traffic subtype classifications and/or attributes, and extract human controlling traffic gesture attributes.

4. The vehicle of claim 1, wherein the task groups comprise:
   a third task group to extract vulnerable road user intent attributes.

5. The vehicle of claim 1, wherein the shared backbone comprises a deep neural network.

6. The vehicle of claim 1, wherein the temporal networks comprise long short-term memory neural networks.

7. The vehicle of claim 1, wherein the temporal networks comprise a first temporal network having a first sequence length, and a second temporal network having a second sequence length that is different from the first sequence length.

8. The vehicle of claim 7, wherein the first temporal network is dedicated to a first task group to extract vulnerable road user subtype classifications, and the second temporal network is dedicated to a second task group to extract human controlling traffic gesture attributes.

9. The vehicle of claim 1, wherein the temporal networks receive vectorized spatial maps corresponding to a sequence of image frames provided as the sensor data to the shared backbone.

10. The vehicle of claim 1, wherein the shared backbone comprises:
    first layers to generate local spatial maps; and second layers downstream of first layers to generate global spatial maps.

11. The vehicle of claim 10, wherein the sub-model further includes one or more spatial networks dedicated to one or more respective task groups to receive the local spatial maps from first layers of the shared backbone and to generate task group specific spatial maps.

12. The vehicle of claim 10, wherein at least one or more of the temporal networks receive task group specific spatial maps and global spatial maps corresponding to a sequence of image frames provided as the sensor data to the shared backbone.

13. The vehicle of claim 1, wherein the heads comprise fully connected neural network layers for the respective task groups.

14. The vehicle of claim 1, wherein the understanding part is configured to correct confidence estimates of inferences output by the heads.

15. A computer-implemented method for understanding vulnerable road users and controlling a vehicle based on the understanding, the method comprising:
    determining, by a main understanding model, that a tracked object has a vulnerable road user classification;
    providing sensor data corresponding to the tracked object having the vulnerable road user classification to a sub-model;

determining, by the sub-model, a plurality of inferences based on the sensor data, wherein: determining the plurality of inferences comprises:

processing the sensor data using a shared backbone;

processing global spatial maps by temporal networks dedicated to respective task groups; and generating inferences based on respective outputs of the temporal networks by heads that are dedicated to the respective tasks groups; and the inferences include one or more vulnerable road user subtype classifications and one or more vulnerable road user attributes; and planning a trajectory of the vehicle based on the inferences.

16. The computer-implemented method of claim 15, wherein determining the plurality of inferences further comprises:

processing local spatial maps by one or more spatial networks dedicated to at least one or more respective task groups; and generating task group specific spatial maps by the one or more spatial networks.

17. The computer-implemented method of claim 16, wherein the temporal networks dedicated to respective task groups further process the task group specific spatial maps along with the global spatial maps.

18. The computer-implemented method of claim 15, wherein the temporal networks are configured to process different number of global spatial maps as input.

19. One or more non-transient storage media encoding instructions executable by one or more processors to implement an understanding part, wherein the understanding part includes:

a shared backbone to receive and process sensor data generated from sensors of a vehicle corresponding to tracked objects having a vulnerable road user classification;

temporal networks dedicated to respective task groups; and heads to output inferences for the respective task groups, wherein the inferences include one or more vulnerable road user subtype classifications and one or more vulnerable road user attributes, wherein the instructions are executable by the one or more processors to implement a planning part configured to plan a trajectory of the vehicle based on the inferences.

20. The one or more non-transient storage media of claim 19, wherein the temporal networks comprise a first temporal network having a first sequence length, and a second temporal network having a second sequence length that is different from the first sequence length.

* * * * *